(12) United States Patent
Levi

(10) Patent No.: US 10,578,182 B2
(45) Date of Patent: Mar. 3, 2020

(54) COMBINATION GAS SPRING AND DAMPER

(71) Applicant: Avraham Y. Levi, Eagan, MN (US)

(72) Inventor: Avraham Y. Levi, Eagan, MN (US)

(73) Assignee: ROM Acquisition Corporation, Belton, MO (US)

( * ) Notice: Subject to any disclaimer, the term of this patent is extended or adjusted under 35 U.S.C. 154(b) by 9 days.

(21) Appl. No.: 15/985,916

(22) Filed: May 22, 2018

(65) Prior Publication Data

US 2018/0347659 A1    Dec. 6, 2018

Related U.S. Application Data

(60) Provisional application No. 62/512,814, filed on May 31, 2017.

(51) Int. Cl.
*F16F 9/06* (2006.01)
*F16F 9/32* (2006.01)
(Continued)

(52) U.S. Cl.
CPC .......... *F16F 9/3257* (2013.01); *F16F 9/0209* (2013.01); *F16F 9/0218* (2013.01); *F16F 9/0281* (2013.01); *F16F 9/325* (2013.01); *F16F 9/3235* (2013.01); *F16F 9/34* (2013.01); *F16F 9/364* (2013.01); *F16F 2222/12* (2013.01);
(Continued)

(58) Field of Classification Search
CPC .. F16F 9/062; F16F 9/065; F16F 9/064; F16F 9/34; F16F 9/067; F16F 9/325; F16F 9/3257; F16F 9/464; B60G 2202/154; Y10T 16/281; E05F 3/108; E05F 5/02; E05F 5/022
See application file for complete search history.

(56) References Cited

U.S. PATENT DOCUMENTS 1,898,609 A * 2/1933 Anderson ............... E05F 3/108
16/61
2,239,112 A * 4/1941 Nickelsen ............... F16F 9/064
188/318

(Continued)

FOREIGN PATENT DOCUMENTS

WO    WO-02095260 A1 * 11/2002 ........... B60G 17/048

*Primary Examiner* — Bradley T King
*Assistant Examiner* — Stephen M Bowes
(74) *Attorney, Agent, or Firm* — Dewitt LLP; Thomas J. Nikolai

(57) ABSTRACT

Housing has first and second parallel tubular chambers. The first chamber contains a gas spring whose output shaft connects to a first piston of area $A_1$. The second chamber contains a second piston of area $A_2 < A_1$. Piston $A_2$ connects to the device's output shaft. The housing has a valve block with an internal port in fluid communication with the two chambers between the first and second pistons. The valve block contains an incompressible fluid. A poppet valve is in the internal port. The poppet includes a flow restricting bore therethrough. A force on the output shaft causes the fluid to force open the poppet and displace the piston, $A_1$, storing energy in the gas spring. Upon removal of the force on the device's output shaft, the gas spring pushes the fluid to close the poppet. Hence, only a low volume flow through the bore in the poppet is permitted.

7 Claims, 4 Drawing Sheets

(51) Int. Cl.
*F16F 9/36* (2006.01)
*F16F 9/02* (2006.01)
*F16F 9/34* (2006.01)

(52) U.S. Cl.
CPC ..... *F16F 2224/046* (2013.01); *F16F 2230/42* (2013.01); *F16F 2232/08* (2013.01); *F16F 2234/02* (2013.01); *F16F 2236/045* (2013.01)

(56) References Cited

U.S. PATENT DOCUMENTS

| | | | | |
|---|---|---|---|---|
| 2,946,582 | A * | 7/1960 | Blandy | B60G 17/044 267/64.19 |
| 4,153,237 | A * | 5/1979 | Supalla | B60G 17/04 188/266.8 |
| 5,016,317 | A * | 5/1991 | Hung | E05F 3/108 16/54 |
| 5,351,790 | A * | 10/1994 | Machida | B60G 13/003 188/266.2 |
| 6,244,398 | B1 | 6/2001 | Girvin et al. | |
| 8,695,765 | B2 * | 4/2014 | Danek | F16F 9/065 188/284 |
| 2008/0018035 | A1 * | 1/2008 | Porter | B60G 17/08 267/218 |
| 2008/0245630 | A1 * | 10/2008 | Le | F16F 9/064 188/280 |
| 2010/0244340 | A1 | 9/2010 | Wootten et al. | |
| 2011/0115139 | A1 | 5/2011 | Moulik et al. | |
| 2011/0115140 | A1 | 5/2011 | Moulik et al. | |
| 2013/0168194 | A1 * | 7/2013 | Turner | F16F 9/526 188/269 |
| 2014/0090468 | A1 | 4/2014 | Fu | |

* cited by examiner

COMBINATION GAS SPRING AND DAMPER

CROSS-REFERENCED TO RELATED APPLICATIONS

The present application claims priority to earlier filed provisional application Ser. No. 62/512,814 filed May 31, 2017, the contents of which are hereby incorporated by reference.

STATEMENT REGARDING FEDERALLY SPONSORED RESEARCH OR DEVELOPMENT

Not applicable

BACKGROUND OF THE INVENTION

I. Field of the Invention

This invention relates generally to an apparatus for controlling the rate of movement of a load descending under the force of gravity or otherwise and, more particularly, to an improved damper that incorporates a gas spring for storing energy during movement of the load in a first direction and that releases that energy to aid in again moving the load in an opposite direction.

II. Discussion of the Prior Art

Gas springs are found in many applications where a need exists for elevating and supporting a load against the force of gravity. For example, vehicle tailgates and trunk lids are frequently equipped with gas springs to aid in raising them and in supporting them in their raised position. A typical gas spring comprises a cylinder having a piston and piston rod contained therein. A gas, typically nitrogen, is contained in the cylinder between an end of the piston and a closed end of the cylinder. Suitable seals are provided to inhibit leakage of the nitrogen gas from the cylinder.

Now, a load, such as a vehicle tailgate, typically has at least one gas spring affixed between the tailgate and the vehicle frame and arranged such that closing the tailgate moves the piston in a direction to compress the gas and thereby store potential energy. When the tailgate is being lifted, the potential energy stored by the compressed gas is released reducing the force needed to lift and open the tailgate.

Dampers are used to control the motion of a load. They comprise a cylinder body that is oil filled and a piston on a piston rod where the piston includes a series of orifices that restrict oil flow so that motion of the piston rod is slowed down to thereby inhibit slamming of a load. They do not provide a push or pull force; only control the speed of movement through its stroke length.

In many applications there is a need for a device that not only provides a lifting force, but also provides a controlled motion. Also, I have an application where an extended stroke length of an output shaft is needed that could not be found commercially. To meet my requirement, I devised the present invention where a gas spring is combined with a damper in a single unitary body where the damper's output shaft is of an extended length.

SUMMARY OF THE INVENTION

The preferred embodiment comprises an extruded aluminum body in which first and second tubular channels of a predetermined length run side-by-side and each contain a cylindrical sleeve of predetermined differing diameters. The first channel contains a gas spring and on its output shaft is a piston of a first diameter. The other of the sleeve in the other of the two channels contains a piston of a second diameter less than the first diameter on an output shaft whose length is determined by the overall length of the extruded body. Sealing one end of the body is a valve block having a fluid pathway leading from the first channel to the second channel and included in the pathway is a spring-biased poppet valve that includes a bore of a predetermined diameter extending through it. The volumes of the sleeves between the two pistons and the valve block are filled with hydraulic fluid and suitable seals are provided for preventing escape of the hydraulic fluid from the assembly.

When a compressive force, such as the weight of a load element, is applied to the output shaft, the smaller piston on the output shaft acts to apply a hydraulic force to the larger piston on the shaft of the gas spring. This compresses the gas in the gas spring to store energy. Now, when the load on the output shaft is being lifted or otherwise relieved, the energy in the gas spring drives the piston coupled to its shaft to force open the poppet valve against the bias of its spring to assert a hydraulic force against the smaller piston to displace the output shaft of the smaller piston against the load. Damping action is provided by the restriction to oil flow afforded by the small bore in the valve member.

BRIEF DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
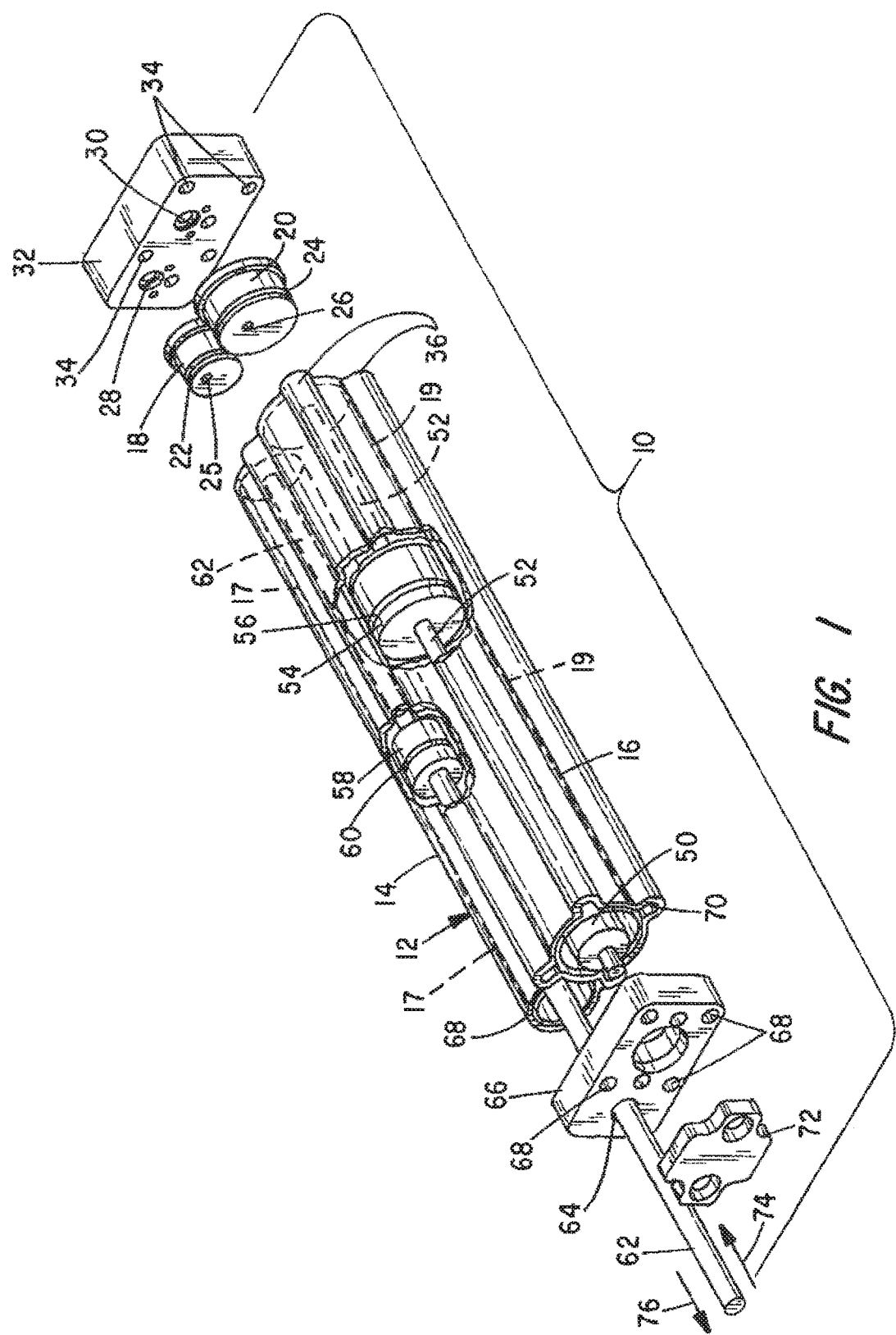
FIG. 1 is an exploded perspective assembly view of a preferred embodiment.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as weld as derivatives thereof (e.g., "horizontally", "downwardly", "upwardly", "forward", "rearward", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 3:
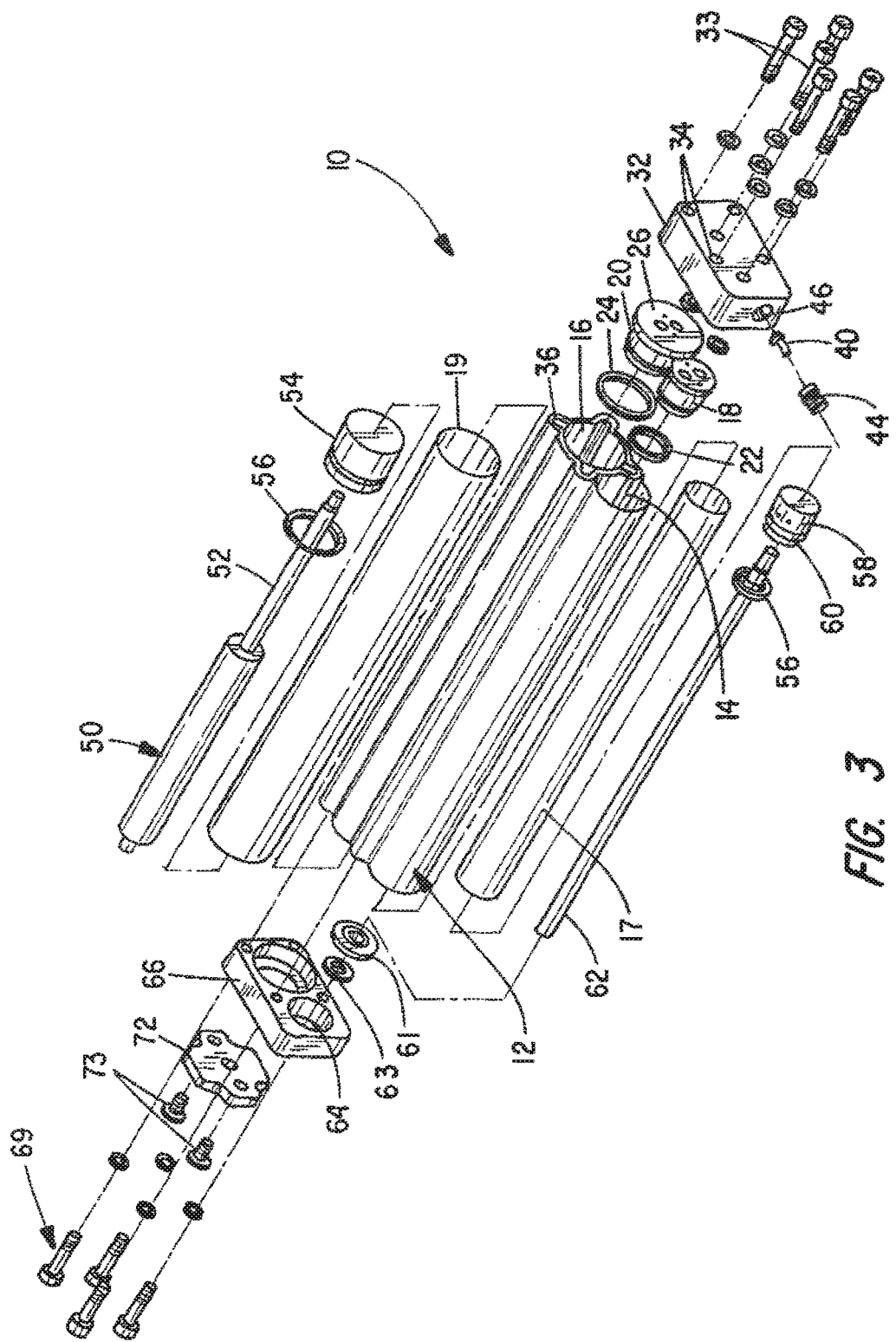
FIG. 3 is a further exploded perspective view of the assembly.

Referring to FIG. 1, the combination gas spring and damper is identified generally by numeral 10 and is seen to include a body 12 preferably of extruded aluminum and comprising first and second tubular channels 14 and 16. Without limitation, the exterior of the body may be generally rectangular, being 10 inches long, 2½ inches wide and 1½ inches in thickness. Fitted into channel 14 is a tubular sleeve 17 (FIG. 3) and fitted into channel to is a tubular sleeve 19.

End caps 18 and 20 with O-ring seals 22 and 24 are designed to fit into a first end of each of the tubular channels 14 and 16. Each of the end caps 18 and 20 has a through bore 25, 26 of a predetermined diameter acting as fluid passages leading to passages 28, 30 in a check valve block 32. The end caps are fastened by screws 33 (FIG. 3) extending through bores 34 and into internally threaded sockets 36 formed in the body extrusion 12. When the check valve block 32 is fastened in place, the bores 28 and 30 (FIG. 1) in the check valve block 32 align with the bores 25 and 26 of the end caps 18 and 20.

Figure 2A:
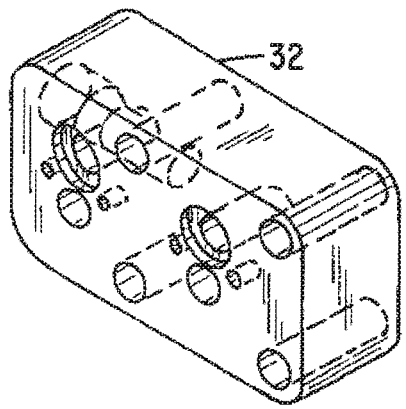
FIGS. 2A-2F are several views illustrating the construction of the valve block of FIG. 1.
Figure 2B:
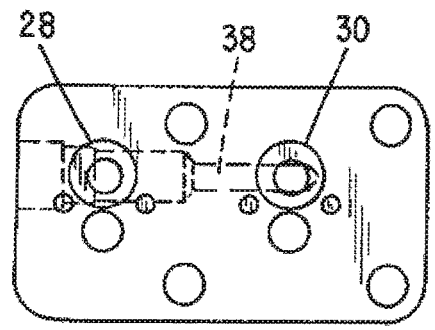
Figure 2C:
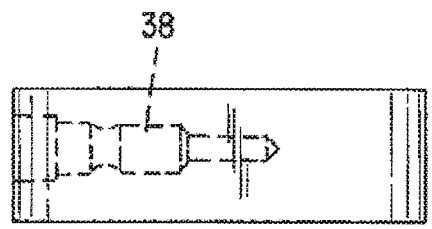
Figure 2D:
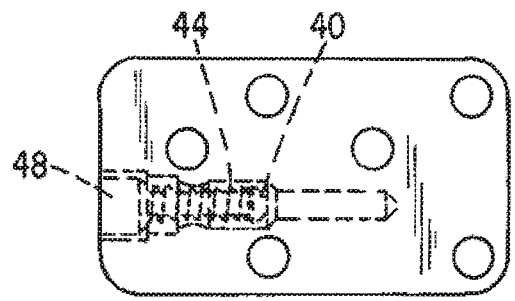
Figure 2E:
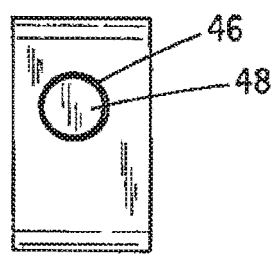
Figure 2F:
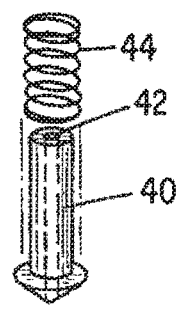

FIGS. 2A-2F show the details of the check valve block 32. The bores 28 and 30 are joined internally of the valve block 32 by a fluid passageway 38 in which is located a spring-loaded check valve (FIG. 2F) oriented as shown in FIG. 2D. The check valve 40 has a small diameter bore 42 of a predetermined diameter extending lengthwise through it. The check valve 40 and spring 44 are insertable into the valve block 32 via a bore 46 (FIG. 2E) and held in place by a threaded plug 48.

Referring again to FIGS. 1 and 3, fitted into sleeve 19 of the channel 16 is a gas spring 50 and affixed to the shaft extension 52 of the gas spring output shaft is a return piston 54. A cup seal 56 cooperates with the ID of the tubular sleeve 19.

Figure 4:
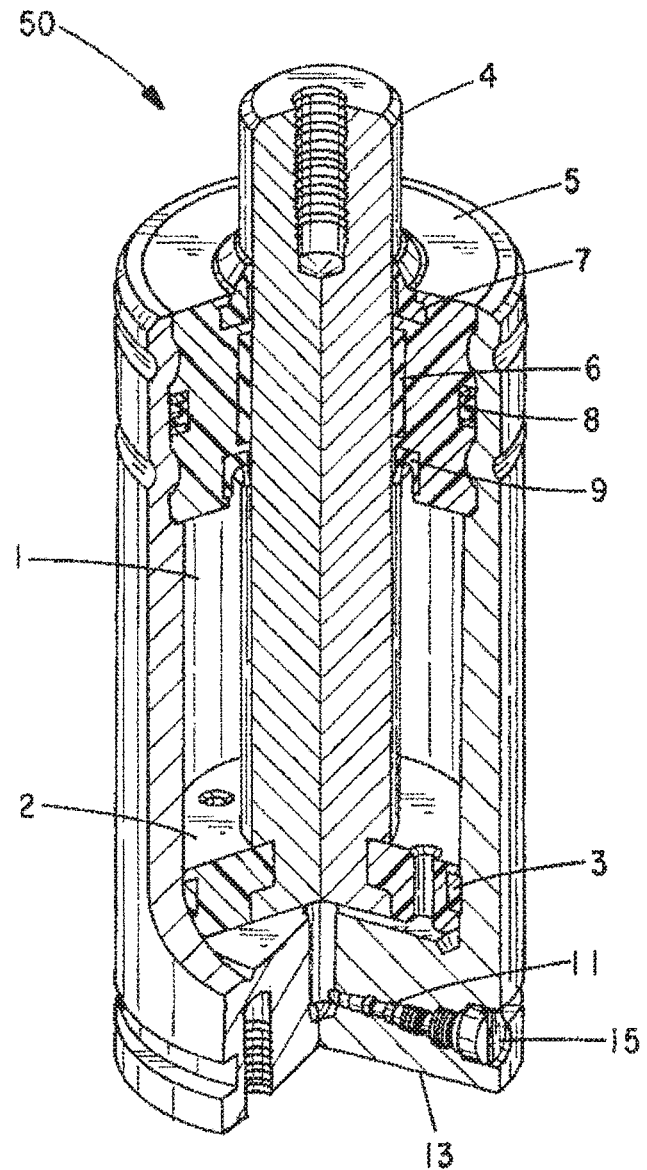
FIG. 4 is a sectional view of a conventional gas spring.

FIG. 4 illustrates the construction of a prior art gas spring. It is seen to comprise a cylinder 1 of a predetermined outer diameter designed to fit within the confines of the sleeve 19. Disposed within the cylinder 1 is a piston 2. It carries a guide bushing 3 for establishing a slight clearance fit to allow the piston 2 to slide within the cylinder 1. The piston 2 is affixed to one end of a piston rod output shaft 4 that extends out from the cylinder through a head cap 5 that supports a piston rod guide bushing 6 and a piston rod wiper 7. An O-ring seal 8 between the head cap and the ID of the cylinder 1 prevents escape of gas that is used to charge the gas spring. Similarly, a piston rod cup seal 9 is provided for the same reason.

A Schrader valve 11 is provided in the end 13 of the cylinder opposite the head cap 5 through which a gas, under pressure, can be introduced between the piston 2 and the end 13 of the cylinder. A valve-sealing screw 15 fits within a threaded bore to inhibit leakage of the pressurized gas from the cylinder.

Disposed in the sleeve 17 in the channel 14 of the body 12 is an output piston 58, again with a cup seal 60 cooperating with the ID of the sleeve 17. The output piston 58 is joined to an end of an output shaft 62 of a desired length to fit a particular application.

In FIG. 1, the volume between the end of the piston 54 and the end cap 20 and the bores in the end caps and in the valve block are filled with hydraulic fluid as is the volume between the end cap 18 and the output piston 58.

The output shaft 62 is made to pass through a bushing 61 and rod wiper 63 (FIG. 3) and then through a bore 64 of a main cap member 66 that is secured to the end 68 of the body 12 by bolts 69 extending through the bores 68 and into internally threaded sockets 70 of the extrusion forming the body 12. A gas spring retainer 72 is likewise fastened to the main cap by the screws 73.

The ratio of the area of the return piston 54 to the output piston 58 may be about 2.5 to 1, but the ratio is a matter of design choice.

In operation, when a force is applied to the output shaft 62 in the direction of the arrow 74 (FIG. 1), the output piston 58 forces hydraulic fluid from the portion of the sleeve 17 ahead of the output piston, through the port 25 in the end cap 18 and through the bore 42 in the check valve 40 and into the channel 16, via the ports in the valve block and the end cap 20. This acts on the large area return piston 54 to deflect the shaft 4 of the gas spring 50 into its cylinder 1 thereby storing energy in the compressed gas.

Now, when the force 74 is lifted (represented by arrow 76), the hydraulic fluid is drawn from the portion of the sleeve 19 ahead of return piston 54, through the bore 26 of end cap 20 and the internal port 38 of the check valve block 32 to open the check valve 40 against the force of the spring 44 and thereby release the stored potential energy of the gas spring 50 and aid in driving the output shaft 62 in the direction of the arrow 76.

Because, in the embodiment being described, a 2.5 to 1 ratio of the areas of the return piston 54 to the output piston 58 is being assumed, if say, 150 pounds of force had been applied to the output shaft 62 in the direction of the arrow 74, under force of gravity to lower a load, the resulting stored energy of the gas spring supplies a return force of about 40% or 60 pounds to aid in again lifting the load. It will also be recognized that the direction of hydraulic fluid flow, as a load is being lowered under the force of gravity, the fluid must pass through the restricted bore 42 extending through the check valve 40 resulting in a relatively slow decent. When the compressive force 74 is relieved, the check valve is forced open, allowing for a more rapid flow from the channel 16 containing the gas spring to drive the output piston 58 in the direction of the arrows 76.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A unitary gas spring and damper comprising:
   a) a body member having first and second cylindrical tubular chambers arranged in side-by-side relation and where the first chamber is of a lesser diameter than the second chamber;
   b) a gas spring having an output shaft and disposed in the second chamber with a first piston affixed to the output shaft of the gas spring and adapted to slide within the second cylindrical chamber;
   c) a second piston disposed in the first cylindrical chamber and slidable therein, the second piston affixed to a damper output shaft and being of a lesser diameter than the first piston;
   d) a valve body (32) with an internal fluid passageway (38) providing bidirectional fluid communication of an incompressible fluid in a volume of the first and second chambers between the first and second pistons, the valve body containing a spring biased valve member (40) for cooperating with a valve seat in said internal fluid passageway, the valve member having a bore (42) of a predetermined diameter extending therethrough; and
   e) a pair of end caps (18), (20) attached to a first end of the body member, the end caps including bores (25)

(26) formed therethrough and in fluid communication with the internal fluid passageway (38) in the valve body (32).

2. The unitary gas spring and damper of claim 1 wherein the body member is an extruded metal of a predetermined length dimension.

3. The combination air spring and damper of claim 1 and further including first and second tubular sleeves respectively lining the first and second tubular chambers of the body member, the tubular sleeve in the second chamber being in surrounding relation with respect to the gas spring and first piston and the tubular sleeve in the first chamber being in surrounding relation to the second piston.

4. The unitary gas spring and damper of claim 3 wherein the gas spring comprises: a tubular cylinder having an outer diameter sized to fit within the second tubular sleeve, a third piston (2) disposed on one end of said gas spring output shaft (4) and slidably moveable within the tubular cylinder with the gas spring output shaft (4) extending out from one end of the tubular cylinder through a head cap (5) and a shaft seal (7) for connection to the first piston, the cylinder being charged with a pressurized gas.

5. The unitary gas spring and damper of claim 1 wherein the end caps include circumferential seals for preventing leakage of the incompressible fluid from the first and second chambers to the ambient.

6. The unitary gas spring and damper of claim 1 and further including circumferential seals carried by the first and second pistons.

7. The unitary gas spring and damper of claim 1 wherein a force applied the damper output shaft to displace the second piston toward the valve body (32) causes the spring biased valve member (40) to seat so that the incompressible fluid must flow through the bore (42) of the predetermined diameter extending through the spring-biased valve member (40) and the incompressible fluid to drive the first piston in a direction to store energy in the gas spring and when the force applied to the damper output shaft is relieved, the gas spring forces the first piston in a direction to displace the incompressible fluid in a direction to unseat the spring-biased valve member (40) and displace the second piston away from the valve body.

* * * * *